United States Patent [19]

Brill-Edwards

[11] 4,278,071
[45] Jul. 14, 1981

[54] ROOFING PANELS

[75] Inventor: Kenneth O. P. Brill-Edwards, Swansea, Wales

[73] Assignee: Crescent Roofing Company Limited, Swansea, Wales

[21] Appl. No.: 13,511

[22] Filed: Feb. 23, 1979

[30] Foreign Application Priority Data

Feb. 24, 1978 [GB] United Kingdom ................ 7426/78

[51] Int. Cl.³ .................... F24J 3/00; E04D 13/16
[52] U.S. Cl. ........................................ 126/428; 52/95; 52/199; 52/302; 52/22; 98/42 A; 165/57
[58] Field of Search ................... 52/302, 303, 95, 199, 52/22; 98/42 R, 42 A; 126/431, 428, 429, 432; 165/53, 54, 57

[56] References Cited

U.S. PATENT DOCUMENTS

| 1,028,725 | 6/1912 | Hodgson | 52/95 X |
|---|---|---|---|
| 2,529,154 | 11/1950 | Hammond et al. | 126/428 |
| 2,852,109 | 9/1958 | Pine | 52/303 X |
| 2,936,723 | 5/1960 | Waldron | 52/302 X |
| 3,086,323 | 4/1963 | Pine | 52/303 X |
| 3,683,785 | 8/1972 | Grange | 52/95 X |
| 3,863,553 | 2/1975 | Koontz | 98/42 X |
| 4,201,121 | 5/1980 | Brandenburg | 98/42 R X |

FOREIGN PATENT DOCUMENTS

| 729762 | 7/1932 | France | 52/199 |
|---|---|---|---|
| 413633 | 5/1946 | Italy | 52/303 |
| 616720 | 1/1949 | United Kingdom | 52/303 |
| 1521637 | 8/1978 | United Kingdom | |

Primary Examiner—Stephen P. Garbe
Attorney, Agent, or Firm—Posnack, Roberts, Cohen & Spiecens

[57] ABSTRACT

A G.R.P. roofing panel is stiffened by longitudinal beams on its underside and is designed to span one pitch of a pitched roof from eaves to ridge. It has an outer skin and an inner impervious liner spaced therefrom and supported on the stiffening beams so as to form a tunnel open at both ends and extending from the vicinity of the eaves to the line of the roof ridge, where vents to atmosphere are provided in the outer skin. Air is convected upwards through the tunnel due to the heating of the outer skin by radiation from the sun, and a damper controls this flow of air. It can be arranged to operate differentially on air flowing in from outside the building and air flowing in from the roof space through a port in the liner. At the line of the ridge the liner meets and is sealed to the corresponding liner of a counterpart panel on the opposite pitch of the roof so as to maintain the integrity of the convection air circuit in each section of the roof. A heat exchanger suitably located in the tunnel transfers heat from the convected air to a hot water system in the building. A hollow box girder spans the width of the panel across the beams so as to rest on the top of a flank wall of the building and can be filled with concrete to anchor the panel in position.

18 Claims, 10 Drawing Figures

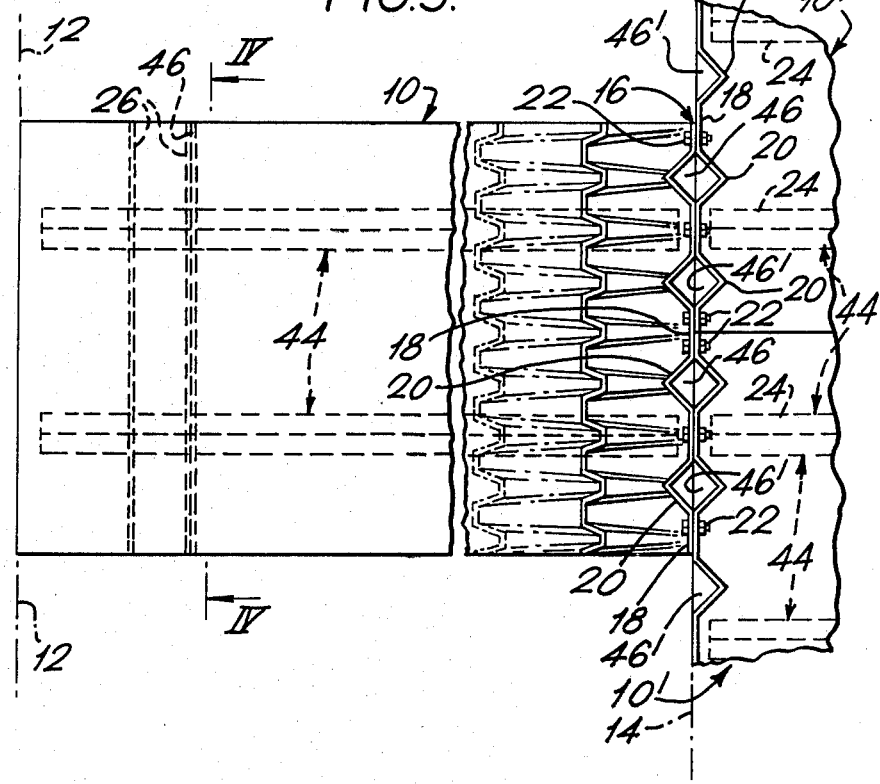
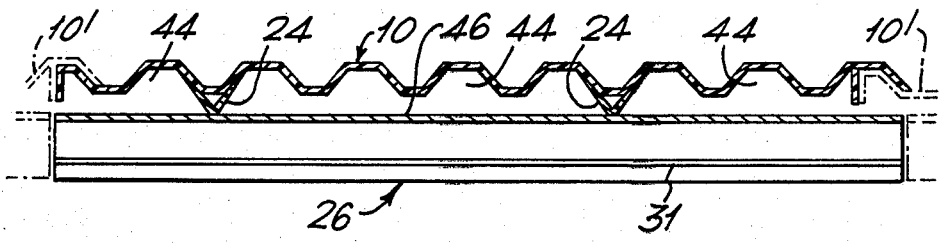

VARIATION OF FLOW RATE WITH INLET AREA (TABLES 1 & 2)

VARIATION OF FLOW RATE WITH SURFACE-UNDERSIDE TEMPERATURE DIFFERENCE (TABLES 3 & 4)

VARIATION OF FLOW RATE WITH SURFACE TEMPERATURE AND UNDERSIDE TEMPERATURE (TABLES 3 & 4)

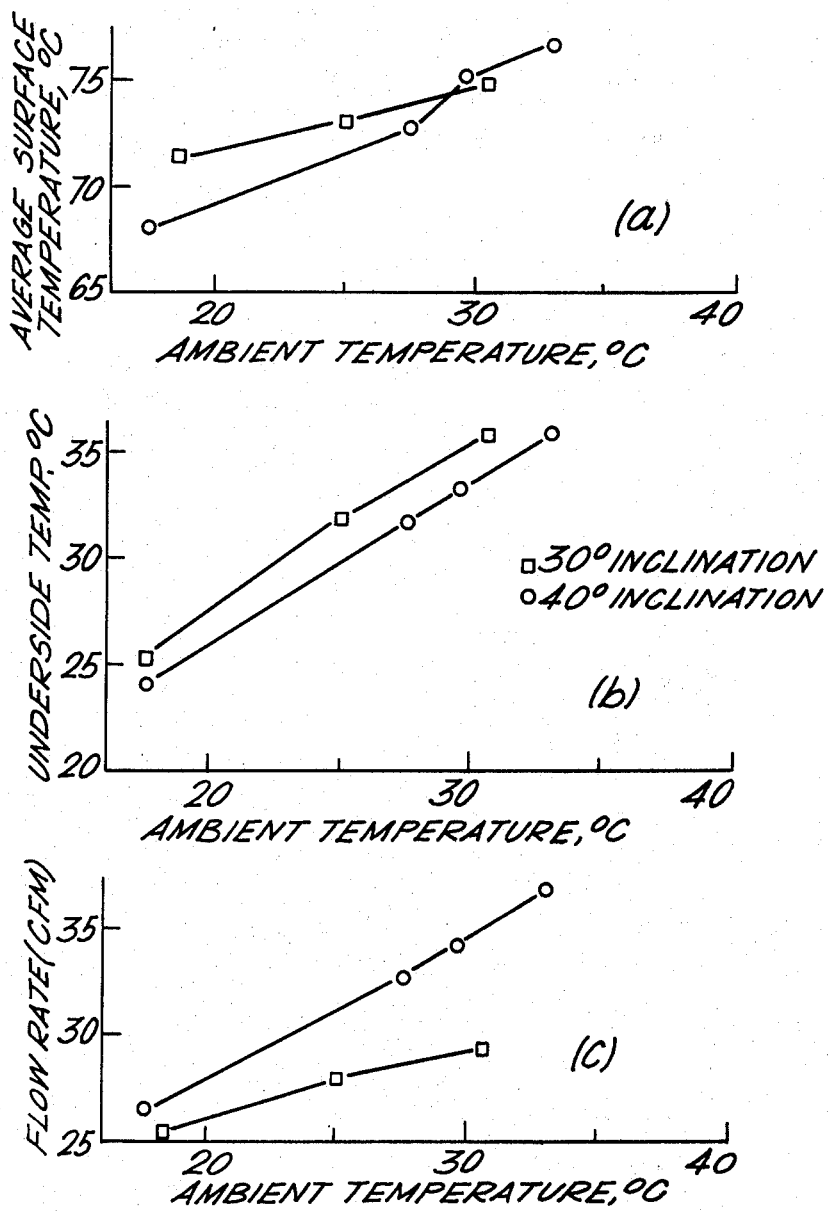
FIG.10. VARIATION OF SURFACE TEMPERATURE, UNDERSIDE TEMPERATURE AND FLOW RATE WITH AMBIENT TEMPERATURE (TABLES 5 & 6)

ROOFING PANELS

FIELD OF INVENTION

This invention relates to roofing panels, and more particularly, although not exclusively, to roofing panels made of glass-reinforced plastics (G.R.P.).

In British Pat. No. 1,521,637, and in the pending application U.S. Ser. No. 919,956, filed June 28, 1978, there are described various designs of roof panel, primarily intended for manufacture in G.R.P., and of a length to extend from the eaves to the ridge of the roof, although in roofs of large span, panels can be butted end-to-end. One feature of these designs is an integral longitudinal stiffening beam extending substantially from eaves to roof. Usually there are two or more such beams, each normally of the same material as the panel, one or more plies of the panel being preferably "laid up" over a beam former when it is in position on the partly finished panel.

Another feature of the panel disclosed in the said British patent and pending U.S. application is the formation, within the main body of the panel, of a plurality of fluid circulation ducts whereby oil or water passing through them collects heat from the sun's radiation falling on the external surface of the panel and so enables the radiant energy to be converted into a more readily usable form within the building—for example, hot water. One advantage of such a panel is that, in hot weather, less heat is transmitted to the interior of the building than if the panel were a simple single skin structure. But however effective the fluid circulation ducts may be in absorbing radiant heat from the sun, and thus in reducing the amount of heat transmitted to the interior of the building, they can only cover a limited area of each roof panel, leaving the remaining areas as relatively high heat transmitters.

Numerous proposals have been made to superimpose on the external surfaces of roofs and walls separate fluid circulation panels for the absorption of radiant energy from the sun and its conversion into heat in water or other fluid circulated through the superimposed panels. Such panels can, if required, be dimensionsed so as to cover an entire roof area and act as roof insulators, so that a higher degree of protection from heat transmission through the roof can be afforded.

One drawback of the superimposed panels is that the flow and return fluid header connections normally have to penetrate the roof skin, leading to considerable weather seal problems. But what none of the aforesaid prior proposals are able to provide in a ventilation system for the interior of the building, drawing air by natural thermal circulation upwards over the underside of the roof panels and discharging it to atmosphere at the ridge. It is an object of the present invention to provide a construction of roof panel whereby this can be achieved if desired.

If the temperature of the underside of a roof panel is high enough to establish and maintain a rising current of air thereover, a system designed to take practical advantage of this physical phenomenon can be designed also to extract heat from the air current prior to its discharge to atmosphere and produce a usable product such as hot water.

It is important in practice to be able to select, in any given circumstances, whether or not to take advantage of a ventilating facility. On the other hand, whenever meteorological conditions are favourable, it is more than likely that a heat exchange facility will be a considerable advantage. Consequently, it is an aim of the present invention to provide a roofing panel which is capable of combining a ventilating system with a heat exchanger.

Another object is to provide for selective controllability of the ventilating air flow.

SUMMARY OF INVENTION

According to the present invention a roofing panel comprises an outer skin of a structural sheet material such as glass-reinforced plastics adapted to span a pitch of a roof from eaves to ridge and adapted to be secured at the ridge end to a counterpart panel of the opposite pitch of the roof so as to provide one or more ventilation gaps between the panels; an integral longitudinal stiffening beam extending along the underside of the panel substantially from eaves to ridge; and a generally flat inner liner of impervious sheet material sealed along its longitudinal edges to the outer skin and spaced therefrom by the beam to form a tunnel extending from eaves to ridge, the ridge end of the liner being adapted to be sealed to the corresponding end of the inner liner of the counterpart panel.

Preferably, each panel terminates at its ridge end in an upstanding flange which is corrugated to present a wavy or castellated contour in plan such that each rib of a corrugation can register with and be secured to the corresponding rib on the counterpart panel.

Alternatively, each upstanding flange is straight and offset slightly back from the vertical plane in which the ridge ends of the liners meet so that spacers can be inserted between the flanges at intervals along the line of the ridge to define ventilation gaps.

Advantageously, a hollow box girder is fixed transversely to the underside of the stiffening beam at the eaves end of the panel to register with and rest upon the top of a side wall of the building when the panel forms part of the roof structure in situ, and the eaves end of the liner meets and is sealed to the girder.

Conveniently, each panel has two laterally spaced stiffening beams and the liner spans the gap between them.

A practical embodiment of the present invention will now be described, by way of example only, with reference to the accompanying drawings.

BRIEF DESCRIPTION OF DRAWINGS

FIG. 3 is a fragmentary plan view of FIG. 1;

FIG. 4 is a section on the line IV—IV of FIG. 3;

DETAILED DESCRIPTION

Figure 1:
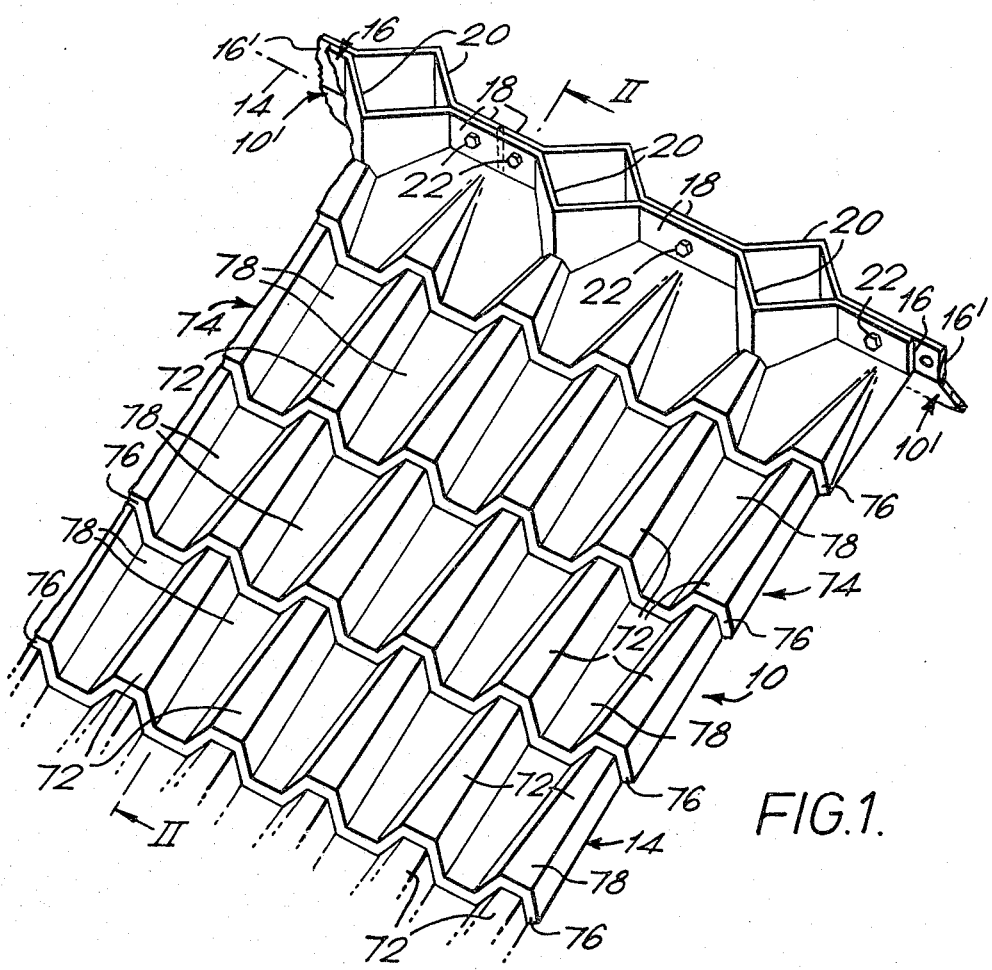
FIG. 1 is a fragmentary perspective view of a panel showing abutting ridge flanges.
Figure 2:
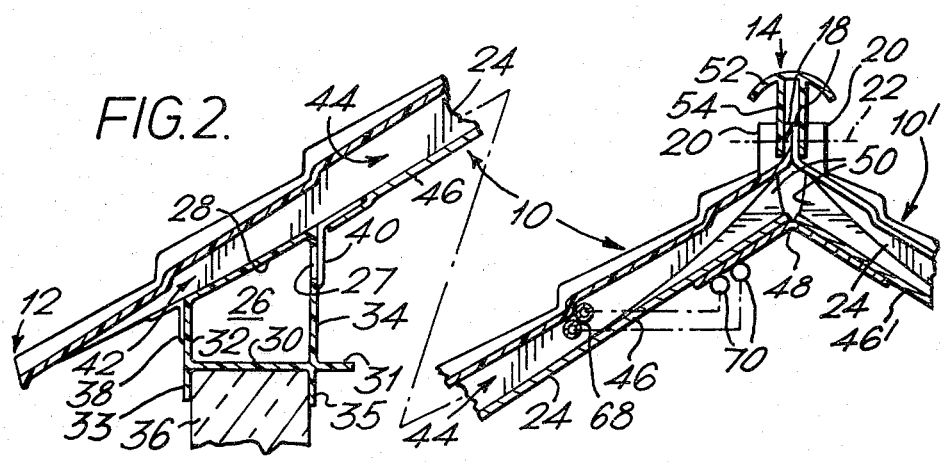
FIG. 2 is a fragmentary transverse sectional elevation on the line II—II of FIG. 1.

Referring first to FIGS. 1-4, the outer skin of a roofing panel 10 is formed in, say, glass-reinforced plastic (G.R.P.) so that its outer or upper surface resembles Roman tiles. The panel extends from the eaves at 12 to the ridge line 14 of a pitched roof on a building such as a house. At the ridge line 14, the panel 10 terminates in an upstanding corrugated ridge flange 16 which presents a castellated profile in plan, each rib 18 alternating with a triangulated valley 20 and registering with a counterpart rib 18 on the flange 16' of an oppositely pitched panel 10'. Where two valleys 20 register, a vent is formed which opens the space beneath the outer skin of the panel 10 to atmosphere. Bolts 22 or like fixings passed through the mating ribs 18 secure the panels 10, 10' at the roof ridge.

On the underside of the outer skin of each panel 10, 10' are integral stiffening beams 24 whose positions transversely of a panel are such that whether the panels 10, 10' are exactly aligned or whether they are staggered by a half width (as shown in FIG. 3), two beams 24 on opposite sides of the ridge line 14 always lie in the same vertical plane. The crests of the beams 24 are preferably convex downwards, the height of the beam from root to crest increasing progressively from zero at the eaves line 12 and the ridge line 14 to a maximum at about mid-span. Each panel 10 has two beams 24 to the undersides of which, adjacent the eaves line 12, is secured a transverse hollow box girder 26 having continuous top and bottom walls 28, 30 and continuous outer and inner flank walls 32, 34 respectively. The flank walls 32, 34 are extended downwards at 33, 35 to embrace the top course or wall plate of an external side wall 36 of the building of whose roof the panel 10 will form a part. The bottom wall 30 of the box girder 26 is extended inwards at 31 to provide a fixing flange for a ceiling structure (not shown). The box girder 26 is secured transversely to each stiffening beam 24 by means of depending outer and inner brackets 38, 40 which engage the outer and inner flank walls 32, 34 of the girder. The girder lies parallel to the eaves line 12 between the vertical planes containing the opposite edges of the panel 10. Provision can be made for inter-fitting the meeting ends of adjacent box girders 26 in a substantially fluid-tight manner, but normally an adequate seal is obtained when the meeting edges are designed to abut. Concrete can be pumped into each box girder 26 through an aperture 27 (FIG. 5), and if it is pumped into the box girders of all the panels in the assembled roof it can provide the necessary anchorage for the roof. The extensions 33, 35 embrace the wall plate or top course of an external flank wall of the building and can be bolted through to provide either an initial location prior to injection of the concrete or a permanent fixing if it is preferred not to fill the box girders 26 with concrete.

The beams 24 are designed to project beyond the outer flank wall 32 of the box girder 26 so that a transverse slot 42 (FIG. 2) is formed between the stiffening beams 24 and bounded by the panel 10 and the top wall 28 of the box girder 26. This slot 42 becomes, according to the present invention, the entrance to a tunnel or duct 44 formed by the bridging of the crests of pairs of adjacent stiffening beams 24 by means of a generally flat, impervious membrane or inner liner 46. This liner can be of any convenient material, whether rigid, semi-stiff, or flexible. In certain applications the compressed fibrous material known generally as "hardboard" is eminently suitable. Other possible materials include sheet metal and plastic sheeting. The eaves end of the liner 46 is sealed for its full width to the inner flank wall 34 of the box girder 26 so as to make an air-tight joint. At the ridge end the liner 46 meets and is sealed to its counterpart or counterparts 46' to form an upwardly convex Vee joint. This joint can be reinforced by a sealing strip or plate 48.

Since each stiffening beam 24 tapers to zero height at the ridge end the liners 46, 46' can either be packed out by means of a greater web 50 formed integrally with the beam 24 at the ridge end, or left separated from the crest of the beam over the required length so as to ensure that the tunnels or ducts 44 are not closed off at their ridge ends. Since each liner 46 or 46' is of the same width as the panel 10, it only needs mechanical support from each beam 24 without the necessity for an air-tight seal between liner and beam. This support can be provided by screws or similar fixings at intervals along the length of each beam, and the crest of each beam may be suitably thickened or reinforced to receive such fixings. The longitudinal edges of the liners 46, on the other hand, must be sealed to the corresponding edges of the adjacent liners so that a double-skin roof structure is achieved with no communication between the inter-skin tunnels or ducts 44 and the underroof space unless deliberately provided. Air can thus flow into the tunnels or ducts 44 through the slots 42 at the eaves ends and discharge through the vents at 20 in the roof ridge.

Whether the vents 20 are formed by the castellation of the ridge flanges 16 or by means of spacers inserted between straight ridge flanges, they may be protected against the undesirable entry of foreign matter, especially rain, by means of an "umbrella" capping 52 (FIG. 2) supported on legs or flanges 54 which are clamped in place by the bolts 22 to hold the capping 52 clear of the vents 20.

Figure 5:
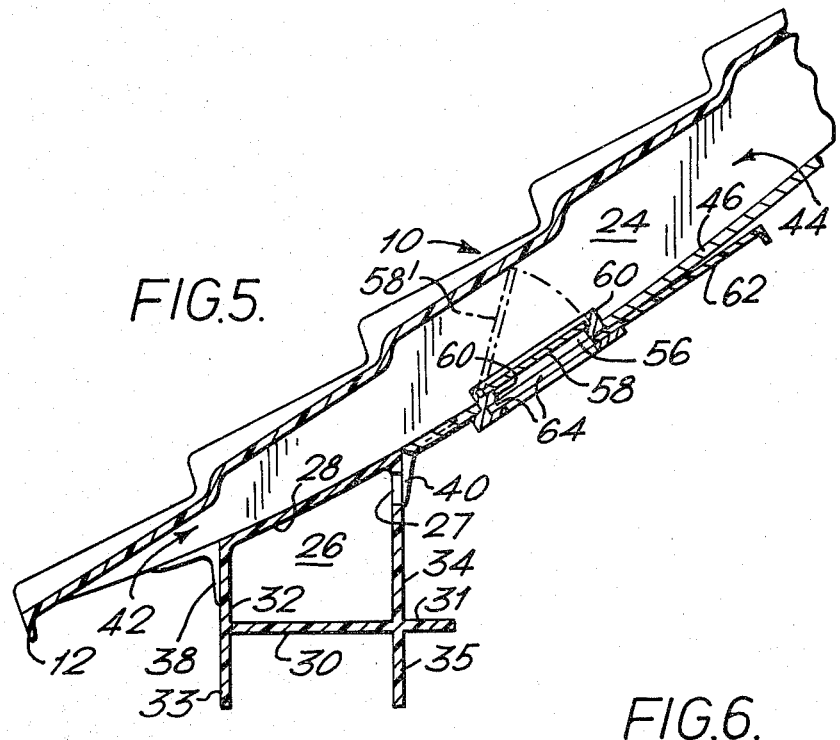
FIGS. 5 and 6 are fragmentary longitudinal section and underplan views, respectively, of a modification, FIG. 5 being a section on the line V—V of FIG. 6, and FIGS. 7-10 are graphs of the test results.
Figure 6:
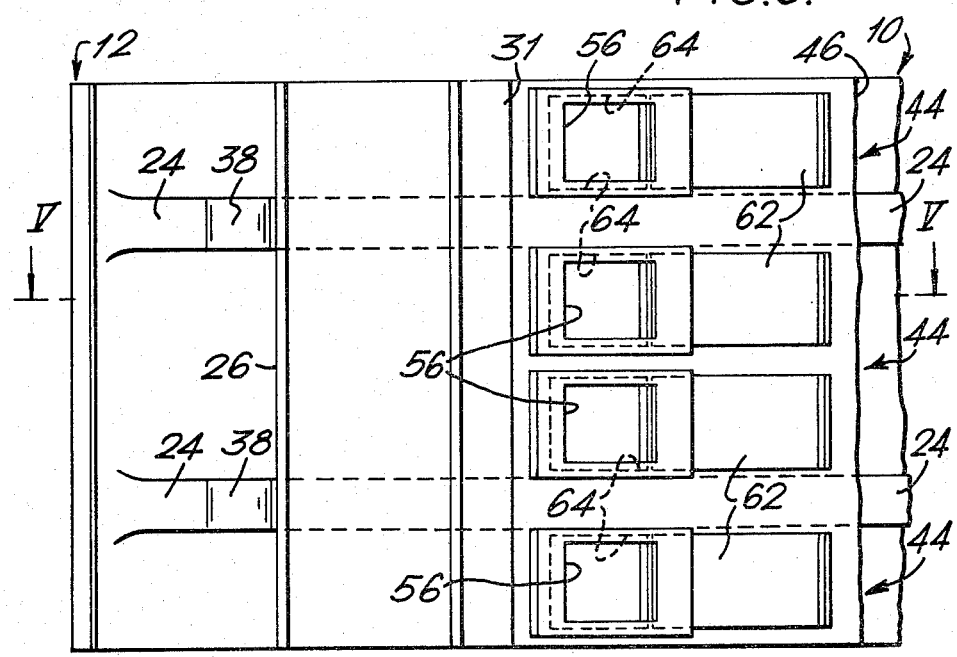

When the outer skin of each panel 10 is heated by the sun, the air within the tunnels or ducts 44 becomes heated and a natural convection flow of air is established from the eaves inlets 42 to the ridge vents 20 which carries much of the incident heat away to atmosphere and maintains the liner 46 relatively cool. Tests have shown that this natural convection can easily reach a volume flow rate of significant magnitude such that the interior of the building covered by the roof can be effectively ventilated. In order to take advantage of this effect, the invention includes the provision of "internal" inlet ports in the liners 46 at points adjacent to, and inboard of, the box girder 26 in conjunction with dampers or flap valves for closing the eaves inlets 42. Such a modification is illustrated in FIGS. 5 and 6, which show ventilation inlet ports 56 in each liner adjacent to, and inboard of, the box girder 26. Each port is controlled by a hinged flap or damper 58 which cooperates with a seating 60 surrounding the port 56 so that the tunnel 44 can be sealed from the interior of the building if desired. When the flap 58 is fully raised, as shown at 58' in FIG. 5, entry of the air through the eaves slots 42 is cut off, or at least throttled to a minimum, and full interior ventilation is provided. At any intermediate position of the flap 58, the air passing up the tunnel 44 is a mixture of interior ventilation air and air from the exterior of the building.

In the event that interior ventilation alone is required, the slots 42 at the eaves can, if necessary, be permanently sealed, and each port 56 can be controlled by a sliding plate 62 (FIG. 6) working in channels 64 in conventional manner. However, permanent sealing of the slots 42 would not normally be adopted so as to enable any water or dust which is driven by the wind down through the roof ridge vents 20 to be discharged outside the building.

Where sufficiently high rates of thermal radiation fall on the outer skin of a panel 10 the temperature of the air convected up each tunnel 44 rises, at or near the vents 20, to a value such that useful heat exchange can be effected. Accordingly, a heat exchanger, shown diagrammatically at 68 (FIG. 2), may be located near the top of each tunnel 44 in the form of gilled tubes through which is circulated a heat exchange fluid. Thus, for example, a loop consisting of a flow and a return gilled pipe connected in series may be mounted transversely of the tunnel, each loop being connected across a pair of flow and return headers 70 located below and parallel to the line 14 of the roof ridge. Preliminary tests on a prototype convection panel 10 according to the present invention seem to indicate that there is usually a "hot spot" about one fifth of the length of the tunnel 44 back from the roof ridge, and hence this might be the optimum location for the heat exchange loop.

The tests referred to above were made on a panel 10 having two symmetrically spaced stiffening beams 24 and a single tunnel or ventilating duct 44 between them. Other structural details are as follows:
material of outer skin: G.R.P.
average thickness of outer skin: ⅛ in.
material of liner: hardboard
average width of tunnel 44: (approx.) 20 in.
length of tunnel 44-inlet 56 to vent 20: 10 feet
max. area of inlet port 56: 77.5 in$^2$.

The tests are tabulated below, and graphs of the results are included in the drawings. They lead to the following main conclusions:

1. The temperature on the underside of the composite panel is much lower than the surface temperature—mostly less than half—especially at the higher surface temperatures (all tables: $T_W$).
2. The volume flow rate of air up the tunnel 44 increases by about 10% for an increase in inclination of the panel 10 from 30° to 40° (see FIG. 7), but the optimum area of the inlet port 56 seems to be about one half that used in the test panel.
3. The volume flow rate of air increases significantly with ambient temperature (see FIG. 10C).

Figure 9:
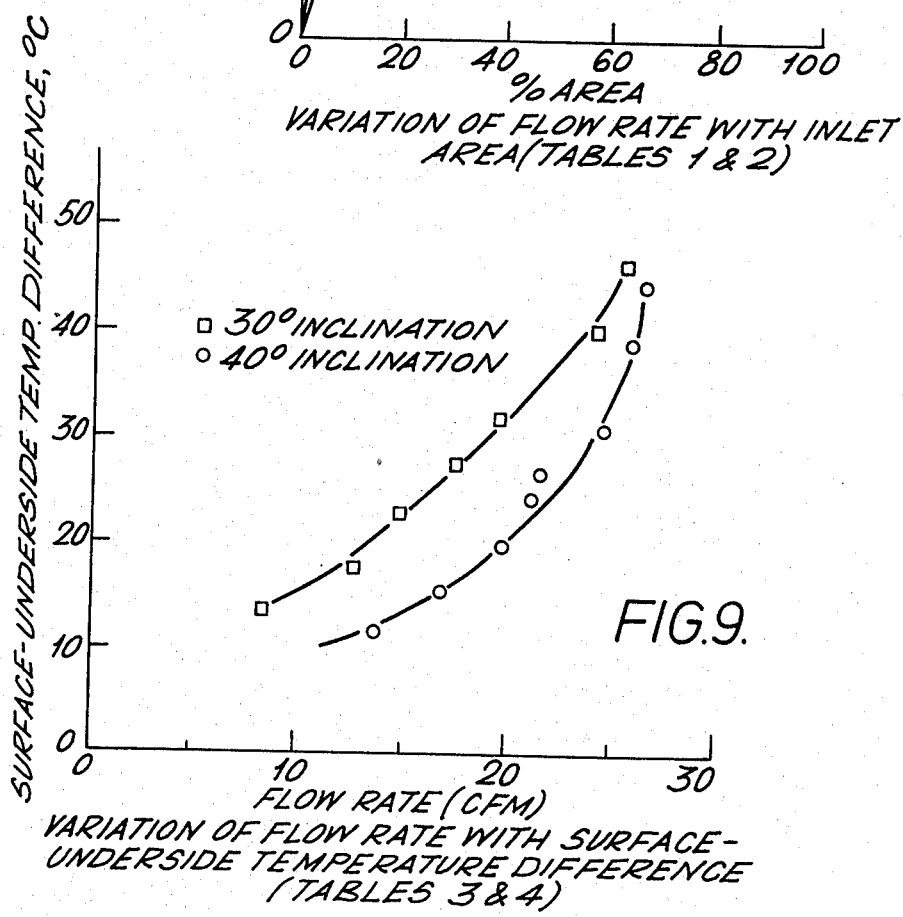
Figure 8:
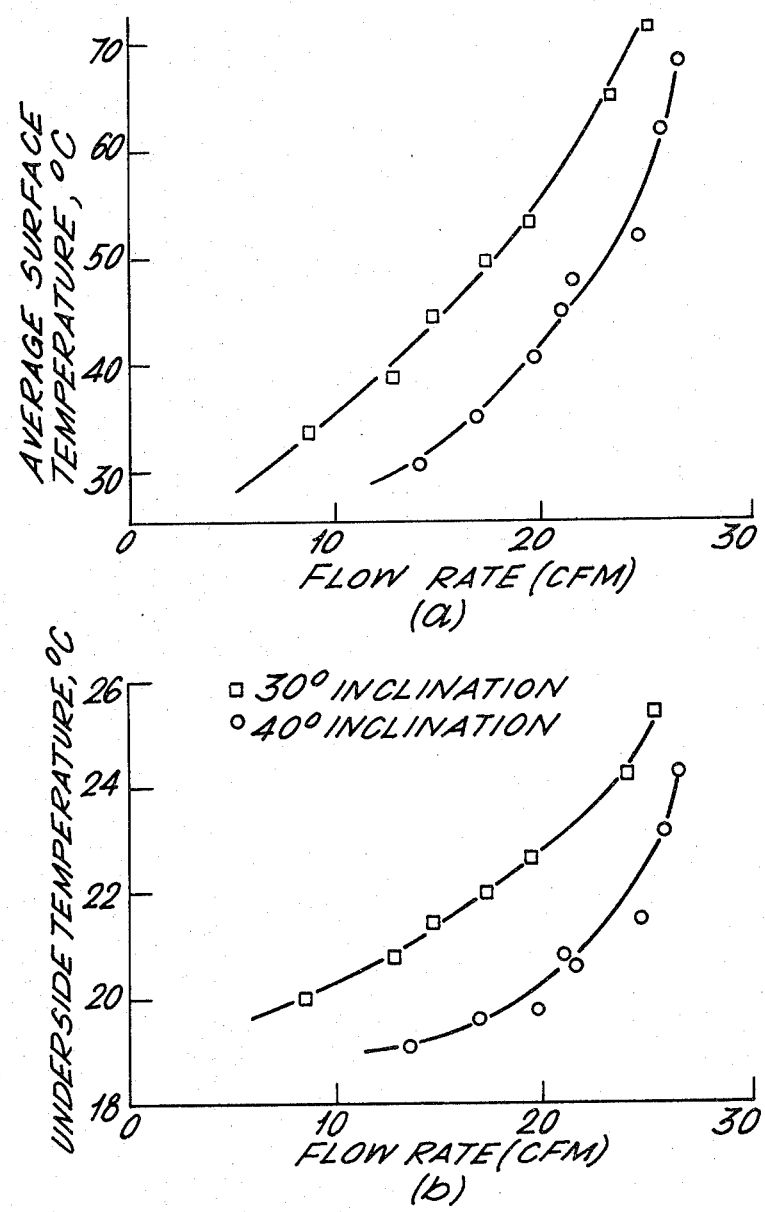

From the curves of FIG. 8 it appears that the volume flow rate of air circulating through the tunnels 44 tends to maximum irrespective of any increase in temperature of the outer skin. FIG. 9 shows the volumetric flow rates obtained with any given value of temperature difference across the tunnel 44 for two different inclinations of the panel 10, and demonstrates the increase in temperature difference which is required to establish a given volumetric flow rate as the angle of inclination of the panel 10 is reduced from 40° to 30°.

In the drawings, the outer skin of a panel is shown as having longitudinal corrugations 72 (FIG. 1) divided transversely into rows 74 by steps 76 to simulate overlapping courses of tiles. The corrugations are separated by flat valleys 78, and taper in both width and height. It is to be understood the outer skin of a panel according to the present invention may have any other surface configuration, including flat.

It is to be understood that, although in the preceding description and the drawings it has been assumed that each pitch of a roof will be spanned by a unitary panel structure 10, the invention is not restricted to such a situation. Thus, where a roof pitch is larger than can conveniently be spanned by a single unitary panel 10, lower and upper panel sections can be arranged to abut end-to-end so that, after assembly, the elongated structure behaves as an integral panel unit. Furthermore, for constructional convenience during assembly on site, the upper end of the lower panel section (equivalent to the ridge line 14 of a single panel 10) and the lower end of the upper panel section (equivalent to the eaves line 12 of a single panel 10) can be formed with plane upstanding flanges for securing the sections together.

TABLE 1

Figure 7:
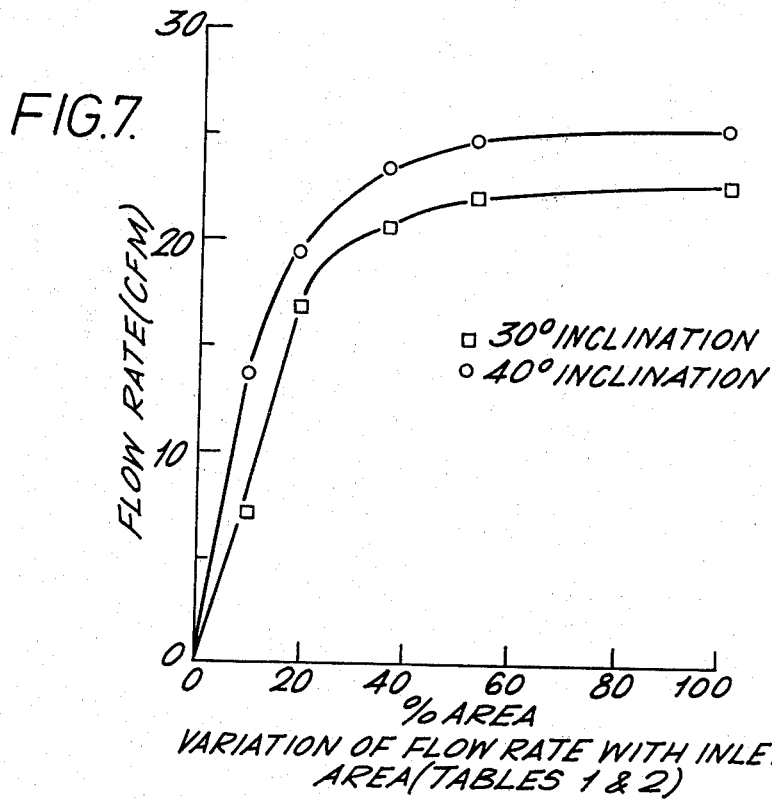

TABULATION OF RESULTS OF TESTS ON PANEL
Convection Panel Inclination = 30°
Constant Heat Input
Ambient Temperature = 18° C.
Inlet Port Opening Variable (FIG. 7)

| Quantity | Run No. | | | | |
|---|---|---|---|---|---|
| | 1 | 2 | 3 | 4 | 5 |
| Average surface temperature $T_s$, °C. | 58 | 57.3 | 61.6 | 60.4 | 61.7 |
| Average underside temperature $T_w$, °C. | 26 | 24 | 24.1 | 23 | 23.4 |
| $T_s$-$T_w$, °C. | 32 | 33.3 | 37.5 | 37.4 | 38.3 |
| % of fully open port area | 9 | 17.4 | 35 | 52 | 100 |
| Air volume flow rate at inlet cfm. | 7.11 | 16.8 | 20.7 | 22 | 22.6 |

TABLE 2

Convection Panel Inclination = 40°
Constant Heat Input
Ambient Temperature = 18° C.
Inlet Port Opening Variable (FIG. 7)

| Quantity | Run No. | | | | |
|---|---|---|---|---|---|
| | 1 | 2 | 3 | 4 | 5 |
| Average surface temperature $T_s$, °C. | 60.4 | 58.8 | 59.9 | 60.2 | 60 |
| Average underside temperature $T_w$, °C. | 26.2 | 25.3 | 24.9 | 24.7 | 24.5 |
| $T_s$-$T_w$, °C. | 34.2 | 33.5 | 35 | 35.5 | 35.5 |
| % of fully open port area | 9 | 17.4 | 35 | 52 | 100 |
| Air volume flow rate at inlet cfm. | 13.6 | 19.4 | 23.5 | 24.8 | 25.2 |

TABLE 3

Convection Panel Inclination = 30°
Heat Input Variable
Ambient Temperature = 18° C.
Inlet Port Area Fully Open (FIG. 8)

| Quantity | Run No. | | | | | | |
|---|---|---|---|---|---|---|---|
| | 1 | 2 | 3 | 4 | 5 | 6 | 7 |
| Average surface temperature $T_s$, °C. | 71.4 | 64.2 | 53.3 | 49.4 | 44.2 | 38.2 | 33.5 |
| Average underside temperature $T_w$, °C. | 25.3 | 24.2 | 22.6 | 22 | 21.4 | 20.7 | 20 |
| $T_s$-$T_w$, °C. | 46.1 | 40 | 30.7 | 27.4 | 22.8 | 17.5 | 13.5 |
| Air volume flow rate at inlet cfm | 25.3 | 24 | 19.4 | 17.4 | 14.7 | 12.7 | 8.68 |

TABLE 4

Convection Panel Inclination = 40°
Heat Input Variable
Ambient Temperature = 17.5° C.
Inlet Port Area Fully Open (FIG. 8)

| Quantity | Run No. | | | | | | | |
|---|---|---|---|---|---|---|---|---|
| | 1 | 2 | 3 | 4 | 5 | 6 | 7 | 8 |
| Average surface temperature $T_S$, °C. | 68.1 | 61.6 | 51.8 | 47.3 | 44.9 | 40.1 | 34.9 | 30.6 |
| Average underside temperature $T_w$, °C. | 24.2 | 23.1 | 21.4 | 20.6 | 20.8 | 20.4 | 19.6 | 19.1 |
| $T_S-T_w$, °C. | 43.9 | 38.5 | 30.4 | 26.7 | 24.1 | 19.7 | 15.3 | 11.5 |
| Air volume flow rate at inlet cfm | 26.4 | 25.7 | 24.7 | 21.4 | 21 | 19.7 | 16.7 | 13.7 |

TABLE 5

Convection Panel Inclination = 30°
Constant Heat Input
Ambient Temperature Variable
Inlet Port Area Fully Open (FIG. 10)

| Quantity | Run No. | | |
|---|---|---|---|
| | 1 | 2 | 3 |
| Average surface temperature $T_S$, °C. | 71.4 | 73 | 74.7 |
| Average underside temperature $T_w$, °C. | 25.3 | 31.8 | 35.8 |
| $T_S-T_w$, °C. | 46.1 | 41.2 | 38.9 |
| Ambient temperature °C. | 18.5 | 25 | 30.5 |
| Air volume flow rate at inlet cfm | 25.3 | 28 | 29.3 |

TABLE 6

Convection Panel Inclination = 40°
Constant Heat Input
Ambient Temperature Variable
Inlet Port Area Fully Open (FIG. 10)

| Quantity | Run No. | | | |
|---|---|---|---|---|
| | 1 | 2 | 3 | 4 |
| Average surface temperature $T_S$, °C. | 68.1 | 72.6 | 75.1 | 76.7 |
| Average underside temperature $T_w$, °C. | 24.2 | 31.6 | 33.2 | 35.7 |
| $T_S-T_w$, °C. | 43.9 | 41 | 41.9 | 41 |
| Ambient temperature °C. | 17.5 | 27.5 | 29.5 | 33 |
| Air volume flow rate at inlet cfm | 26.4 | 32.6 | 34.4 | 36.5 |

I claim:

1. A roof structure for a roof including a ridge and eaves and having pitches between said ridge and said eaves, said structure comprising panels each including an outer skin of an inert structural material for spanning said pitches of said roof from said eaves to said ridge; said panels including ridge and eaves ends; said skin including outer and under sides; a fixing formation means at the ridge ends of the panels to engage the panels and to define a ventilation gap between the adjacent ridge ends of the two panels; integral longitudinal stiffening beams on the undersides of each said outer skin and extending at least substantially from the eaves to the ridge; generally flat inner liners of impervious sheet material sealed along a pair of longitudinal lines to each said outer skin and spaced therefrom by engagement with said longitudinal stiffening beam to define a tunnel between said outer skin and said inner liner extending at least substantially from the eaves to the ridge, said liners having ridge and eaves ends, and means for sealing to each other the ridge ends of said inner liners of said panels on said roof pitches.

2. A roofing structure as claimed in claim 1 wherein said fixing formation means at the ridge ends of the outer skins are upstanding flanges of corrugated form in plan so as to alternately make face to face contact with and to diverge from each other to define divergences constituting ventilation gaps.

3. A roofing structure as claimed in claim 1 wherein said fixing formation means at the ridge ends of the outer skins are upstanding rectilinear flanges offset back from the ridge relative to the ridge ends of the inner liners, said panel further including spacer means interengaged at intervals along said flanges to define ventilation gaps between the flanges.

4. A roofing structure as claimed in claim 1 comprising, for each said liner, at least two stiffening beams including crests, the corresponding said inner liner spanning the crests of said stiffening beams.

5. A roofing structure as claimed in claim 4 wherein each said inner liner is of channel shape in transverse cross-section.

6. A roofing structure as claimed in claim 4 wherein each said inner liner terminates short of the corresponding eaves to provide an access opening to the corresponding said tunnel.

7. A roofing structure as claimed in claim 4 wherein each said inner liner is provided with at least one port opening therethrough to afford an access opening to the corresponding said tunnel, said structure further comprising a damper means controlling said port to differentially control flow of air through the corresponding said tunnel with respect to the outside atmosphere.

8. A roofing structure as claimed in claim 7 wherein there are at least two ports, comprising a second damper means to complete closure of one of said access openings while permitting variable obturation of the other.

9. A roofing structure as claimed in claim 1 for a building having supporting walls, said structure comprising a hollow box girder fixed transversely to each said stiffening beam adjacent the eaves end of said panel to register with and rest upon a corresponding one of said walls, the corresponding end of the corresponding said inner liner being sealed to said girder.

10. A roofing structure as claimed in claim 9 wherein said box girder is provided with an aperture through which concrete can be introduced.

11. A roofing structure as claimed in claim 10 wherein each said box girder has at least one end formed to engage in substantially fluid-tight manner with the adjacent end of another said girder.

12. A roofing structure for a roof including a ridge and eaves and having pitches between said ridge and said eaves, said structure comprising panels each including an outer skin of glass-fibre-reinforced plastic simulating a roof tile pattern; said panels including ridge and eaves ends; said skin including outer and under sides; at least two integral reinforcing beams on the underside of each said skin extending from the eaves to ridge ends of the panel; said beams including crests; inner liners of substantially flat relatively stiff air-impervious material sealed to the crests of said reinforcing beams and extending longitudinally from adjacent the corresponding eaves end to substantially the roof ridge; said inner liners being spaced from the undersides of the corresponding said outer skins so as to define, with said reinforcing beams, tunnels having open ends; upstanding ridge flanges on said outer skins and having a castellated shape in plan and adapted to engage each other, and means for sealing said inner liners to each other.

13. A roofing structure as claimed in claim 12 comprising damper means for controlling air flow through said tunnels.

14. A roofing structure as claimed in claim 13 for a building having supporting walls, said structure comprising transverse hollow box girders extending across the crests of said reinforcing beams adjacent the eaves end of the corresponding panel so as to register with and rest upon the top of a corresponding said wall of the said building.

15. A roofing structure as claimed in claim 14 wherein said box girders include outer walls and bases and wherein the outer walls of said box girders extend downwards below the corresponding bases to form fixing flanges for bolting to said supporting walls.

16. A roofing structure as claimed in claim 15 wherein said building includes a ceiling structure and said bases of said box girders are extended inwards to form further fixing flanges for said ceiling structure.

17. A roofing structure as claimed in claim 1 or claim 12 comprising a heat exchanger located within at least one of the tunnels for collecting heat from air in the latter said tunnel by thermal convection.

18. A roofing structure as claimed in claim 17 wherein the heat exchanger is located in a zone of maximum temperature of air flowing along the latter said tunnel.

* * * * *

UNITED STATES PATENT AND TRADEMARK OFFICE
CERTIFICATE OF CORRECTION

PATENT NO. : 4,278,071
DATED : July 14, 1981
INVENTOR(S) : Brill-Edwards

It is certified that error appears in the above—identified patent and that said Letters Patent are hereby corrected as shown below:

Column 1, line 51: change "in" to --is--
Column 4, line 3: change "greater" to --spacer--

Signed and Sealed this

Twenty-seventh Day of October 1981

[SEAL]

Attest:

GERALD J. MOSSINGHOFF

Attesting Officer   Commissioner of Patents and Trademarks